(12) United States Patent
Blaukovitsch et al.

(10) Patent No.: US 6,535,858 B1
(45) Date of Patent: Mar. 18, 2003

(54) OPTICAL DISC COPY MANAGEMENT SYSTEM

(75) Inventors: Reinhard Blaukovitsch, Elixhausen (AT); Andreas Winter, Radstadt (AT)

(73) Assignee: Sony DADC Austria AG, Anif (AT)

( * ) Notice: Subject to any disclaimer, the term of this patent is extended or adjusted under 35 U.S.C. 154(b) by 0 days.

(21) Appl. No.: 09/140,515

(22) Filed: Aug. 26, 1998

(30) Foreign Application Priority Data

Aug. 28, 1997 (EP) .............................. 97114927

(51) Int. Cl.$^7$ .............................................. G06F 17/60
(52) U.S. Cl. .............................. 705/57; 705/1; 705/50; 705/51
(58) Field of Search ................. 380/3, 4; 369/275.3, 369/275.4, 32; 705/1, 50, 51

(56) References Cited

U.S. PATENT DOCUMENTS

| | | | | |
|---|---|---|---|---|
| 5,083,224 A | * | 1/1992 | Hoogendoorn et al. | 360/60 |
| 5,287,468 A | * | 2/1994 | Furuhashi et al. | 710/5 |
| 5,371,792 A | | 12/1994 | Asai et al. | |
| 5,513,169 A | * | 4/1996 | Fite et al. | 380/3 |
| 5,528,572 A | * | 6/1996 | Koizumi et al. | 369/47 |
| 5,538,773 A | | 7/1996 | Kondo | 428/64.1 |
| 5,563,947 A | | 10/1996 | Kikinis | 380/4 |
| 5,572,507 A | * | 11/1996 | Ozaki et al. | 369/275.4 |
| 5,628,015 A | | 5/1997 | Singh | |
| 5,659,613 A | | 8/1997 | Copeland et al. | 380/3 |
| 5,684,785 A | * | 11/1997 | Itami et al. | 380/4 |
| 5,724,327 A | * | 3/1998 | Timmermans et al. | 369/48 |
| 5,761,301 A | * | 6/1998 | Oshima et al. | 380/4 |
| RE35,839 E | * | 7/1998 | Asai et al. | 380/3 |
| 5,905,709 A | * | 5/1999 | Blaukovitsch | 369/275.4 |
| 5,930,209 A | * | 7/1999 | Spitzenberger et al. | 369/32 |
| 5,960,398 A | * | 9/1999 | Fuchigami et al. | 369/275.3 |

FOREIGN PATENT DOCUMENTS

| | | |
|---|---|---|
| EP | 0 416 663 | 3/1991 |
| EP | 0 644 474 | 3/1995 |
| EP | 0 745 925 | 12/1996 |
| FR | 2 640 794 | 6/1990 |
| JP | 08153331 A | * 6/1996 ........... G11B/7/007 |

OTHER PUBLICATIONS

Hugh Bennet, "Kodak's PCD Writer 600 and Disc Transporter: Replication in record time", v8n7 pp:99–105.*
"How Disks Are Padlocked" IEEE Spectrum, vol. 23, No. 6, Jun. 1986, NY, US, pp. 32–40, XP002054317.

* cited by examiner

Primary Examiner—Hyung-Sub Sough
Assistant Examiner—Calvin L Hewitt, II
(74) Attorney, Agent, or Firm—Frommer Lawrence & Haug LLP; William S. Frommer

(57) ABSTRACT

The invention relates to a method of obtaining a copy protected optical record carrier carrying information in different blocks, a method of accessing such a copy protected optical record carrier and such an optical record carrier itself. Access devices for optical carriers return different results when retrieving blocks, which contain incorrect address data in the corresponding subcode fields. A copy protection key will be implemented during manufacture of an optical record carrier by modifying the subcode address information of a predetermined pattern of blocks. It is normally not possible to copy incorrect address data onto an optical record carrier, since the address data will be newly generated during the copy process. Therefore, such a key can be utilized to distinguish between an original disc and a copied or non original disc. The key is preset before manufacturing of the optical record carrier itself and can therefore be used to encrypt the data stored on the optical record carrier. Upon accessing of the data, first the key is extracted from the optical record carrier and then the data can be decrypted utilizing this key.

16 Claims, 5 Drawing Sheets

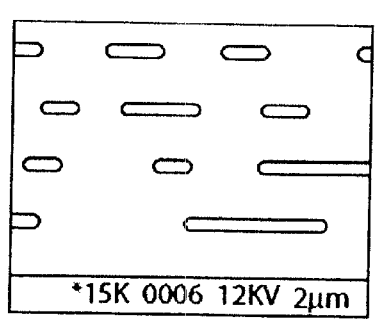
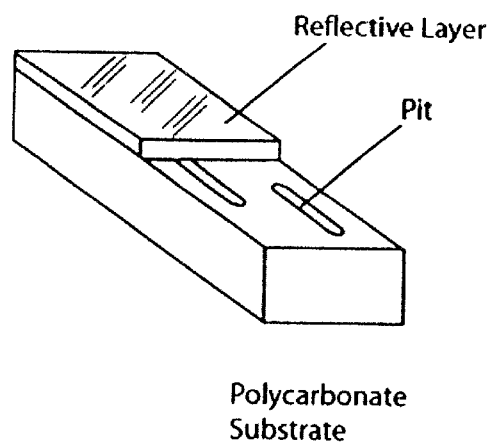
Fig. 1A
Fig. 1B
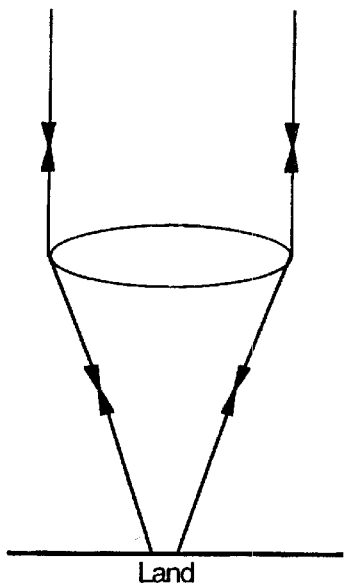
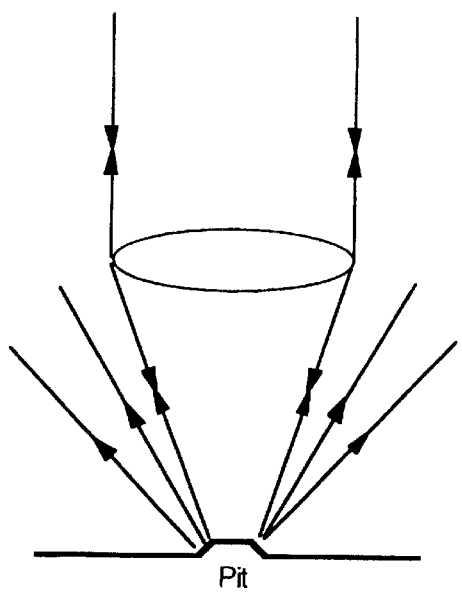
Fig. 2A
Fig. 2B
| Sync (12) | Header (4) | | | | User data (2048) | Auxiliary data | | | |
|---|---|---|---|---|---|---|---|---|---|
| | min | sec | frame | mode | | EDC (4) | Zero (8) | ECC (276) | |
| | | | | | | | | P-Parity (172) | Q-Parity (104) |
Fig. 3

| Frame 0 | 24 bytes data | 4 bytes C2 error correction | 4 bytes C1 error correction | Synchronization |
|---|---|---|---|---|
| Frame 1 | 24 bytes data | 4 bytes C2 error correction | 4 bytes C1 error correction | Synchronization |
| Frame 2 | 24 bytes data | 4 bytes C2 error correction | 4 bytes C1 error correction | $P_0\ Q_0\ R_0\ S_0\ T_0\ U_0\ V_0\ W_0$ |
| Frame 3 | 24 bytes data | 4 bytes C2 error correction | 4 bytes C1 error correction | $P_1\ Q_1\ R_1\ S_1\ T_1\ U_1\ V_1\ W_1$ |
| Frame 4 | 24 bytes data | 4 bytes C2 error correction | 4 bytes C1 error correction | $P_2\ Q_2\ R_2\ S_2\ T_2\ U_2\ V_2\ W_2$ |
| ... | ... | ... | ... | ... |
| Frame 95 | 24 bytes data | 4 bytes C2 error correction | 4 bytes C1 error correction | $P_{93}\ Q_{93}\ R_{93}\ S_{93}\ T_{93}\ U_{93}\ V_{93}\ W_{93}$ |
| Frame 96 | 24 bytes data | 4 bytes C2 error correction | 4 bytes C1 error correction | $P_{94}\ Q_{94}\ R_{94}\ S_{94}\ T_{94}\ U_{94}\ V_{94}\ W_{94}$ |
| Frame 97 | 24 bytes data | 4 bytes C2 error correction | 4 bytes C1 error correction | $P_{95}\ Q_{95}\ R_{95}\ S_{95}\ T_{95}\ U_{95}\ V_{95}\ W_{95}$ |

| | | | | | | | | | |
|---|---|---|---|---|---|---|---|---|---|
| P Channel | $P_0$ | $P_1$ | $P_2$ | . | . | . | . | $P_{93}$ | $P_{94}$ | $P_{95}$ |
| Q Channel | $Q_0$ | $Q_1$ | $Q_2$ | . | . | . | . | $Q_{93}$ | $Q_{94}$ | $Q_{95}$ |
| R Channel | $R_0$ | $R_1$ | $R_2$ | . | . | . | . | $R_{93}$ | $R_{94}$ | $R_{95}$ |
| ... | | | | | | | | | | |
| V Channel | $V_0$ | $V_1$ | $V_2$ | . | . | . | . | $V_{93}$ | $V_{94}$ | $V_{95}$ |
| W Channel | $W_0$ | $W_1$ | $W_2$ | . | . | . | . | $W_{93}$ | $W_{94}$ | $W_{95}$ |

Fig. 4

| 1 bit | 1 bit | 4 bit | 4 bit | 8 bit | 8 bit | 8 bit | 8 bit | 8 bit | 8 bit | 8 bit | 8 bit | 8bit | 16 bit |
|---|---|---|---|---|---|---|---|---|---|---|---|---|---|
| S0 | S1 | Control | Address | TNO | X | Min | Sec | Frame | Zero | Amin | Asec | Aframe | CRC |
Fig. 5
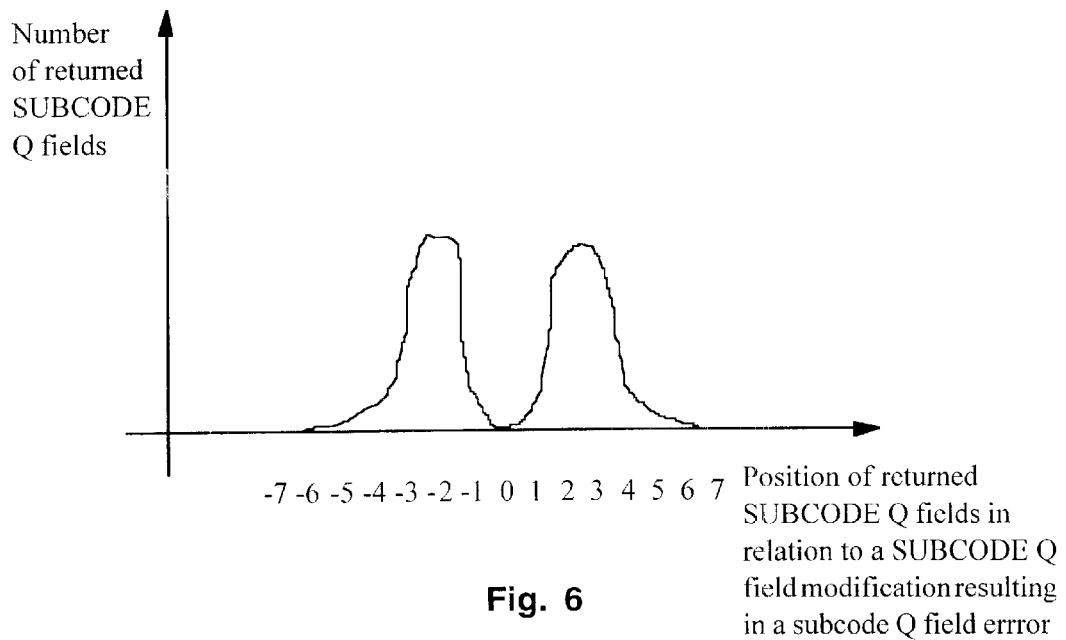
Fig. 6
Position of returned SUBCODE Q fields in relation to a SUBCODE Q field modification resulting in a subcode Q field errror
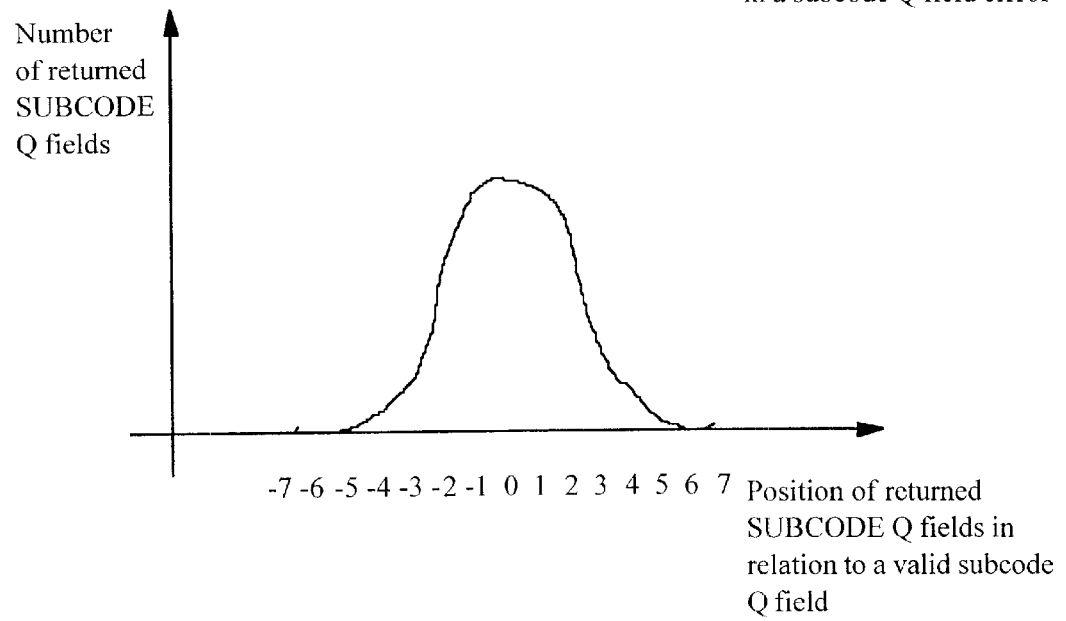
Position of returned SUBCODE Q fields in relation to a valid subcode Q field
Fig. 7

OPTICAL DISC COPY MANAGEMENT SYSTEM

The invention relates to the area of Compact Disc (CD) including all existing or future formats of CD Audio and CD-ROM and any existing or future combinations of compact discs or other optical storage media. In particular the present invention relates to a copy protection and to a copy control mechanism by authentication of optical record carriers, here to a method of obtaining a copy protected optical record carrier, a method of accessing a copy protected optical record carrier and such an optical record carrier itself.

Optical storage discs with information stored on one or both sides have come to be used for a variety of purposes, most notably in the music, games, video and computer industry. Digital information is stored on the optical storage media in the form of pits arranged along circular, concentric tracks on one or on both sides of the disc. The track is typically read from the inside out, but may also be read form outside in, as it is already used for some optical storage media. The data itself on the track is divided into sectors, each equal in length, containing equal amounts of information.

To manufacture an optical storage device, a CD glass master is made by exposing photoresist which is on a glass plate by a modulated laser. The modulation of the laser corresponds to the digital information that is stored on the final disc. Thereafter, exposure, developing and removing those exposed spots form tiny indentations in a single spiral on the glass master are conducted. The pattern and the length of the indentations along this track represent the recorded information digitally. Usually, in a following galvanic process nickel is applied to this glass master to get the nickel master which is the tool for moulding replicas in an injection moulding process. The pattern of the nickel master referred to as pits and land as illustrated in FIGS. 1a and 1b is then embossed on the surface of a polycarbonate or PMMA substrate, which results in a copy of the nickel master that forms the basis of the optical storage disc. The stamped replicas are then coated with a reflective (aluminium or gold) layer and in order to prevent this reflective layer from oxidation a protective layer is applied to the discs.

FIGS. 2a and 2b illustrates the readout of a Compact Disc. A laser beam is focusing onto the surface of the disc. If the laser light falls on the land area most of it will be reflected. If the laser falls on a pit area the light will be refracted and scattered and only a small portion will return in the original direction. This means that the readout electronics can differ between a "0" or "NO" and a "1" or "YES" information and furthermore the electronics of a CD reader can reconstruct the digital information which was recorded onto the disc originally.

Although audio reproduction was the primary motivation for development of the CD, and because of cost reductions resulting from the popularity of audio CDs, the CD has recently become a preferred form for storing data for a computer in the form of read only memory, i.e. CD-ROM.

The format in which audio information is stored on a CD is known as the "Red Book" standard. Under Red Book digital data on a CD is organized into indexed tracks. As illustrated in FIG. 4, the digital samples for left and right audio channels are interleaved with error correcting codes, so called C1. C2 error corrections, and SUBCODE data into organized CD blocks. Throughout the disc, the interleaved SUBCODE information defines the current position in minutes, seconds, frames, both with respect to the current track and with respect to the entire disc.

The so called "Yellow Book" standard is typically as a format for a CD-ROM. The Yellow Book format is similar to the Red Book format in many respects, including the use of data organized into tracks, interleaved with error correction code and SUBCODE information but replacing the Audio information by computer data. Besides the Red Book and Yellow Book standard there exist many more standards developed for optical storage media covering audio data, computer data, video data and combinations of these information.

According to these standards every block of a CD has to be accessible.

FIG. 3 illustrates a standard CD-ROM mode 1 data sector which consists of 12 bytes MAINCODE SYNCHRONIZATION FIELD, 3 bytes ADDRESS, 1 byte MODE, 2048 byte of USER DATA, 4 bytes ERROR DETECTION CODE, 8 bytes of ZEROS and 276 bytes of ERROR CORRECTION CODE. Such a CD-ROM data sector, i.e. CD block or block, comprises 2352 bytes and is 1/75 (one seventy-fifth) of a second.

The 2352 bytes of 1 data sector are carried in 98 Frames depicted in FIG. 4, wherein each Frame includes 24 bytes of said data sector. Additionally to this data, each Frame comprises 4 bytes C2 error correction, 4 bytes C1 error correction and 1 byte SUBCODE data. The 1 byte SUBCODE data is divided into 8 SUBCODE channels called SUBCODE P, Q, R, S, T, U, V. W field, which are also shown in FIG. 4. Each SUBCODE channel consists of 98 bits that are build by 2 synchronization bits and 96 data bits.

As is illustrated in FIG. 5, a SUBCODE Q channel consists of 98 bits, which is referred to as SUBCODE Q field in this invention. All other SUBCODE channels (P, R, S, T, U, V, W) are similar to the Q channel, but carry different information. The first 2 bits of each SUBCODE channel represent the SUBCODE SYNC patterns S0 and S1. These patterns are necessary to synchronize a CD reader to spin the CD at a constant linear velocity.

Each SUBCODE channel has a different function and content, the following description refers to the SUBCODE Q channel only.

The next 4 bits after the SUBCODE SYNC patterns represent the CONTROL FIELD which describes the kind of information of a track as shown in table 1.

TABLE 1

| SUBCODE Q CONTROL FIELD | |
|---|---|
| MSB  LSB | |
| 00x0 | 2 audio channels without pre-emphasis |
| 00x1 | 2 audio channels with pre-emphasis of 50/15 $\mu$seconds |
| 10x0 | 4 audio channels without pre-emphasis |
| 00x1 | 4 audio channels with pre-emphasis of 60/15 $\mu$seconds |
| 01x0 | data track (CD-ROM) |
| 01x1 | reserved |
| 11xx | reserved |
| xx0x | digital copy prohibited |
| xx1x | digital copy permitted |

The next four bits represent the ADDRESS FIELD and specify the mode. There are several modes (e.g. mode 1, mode 2, mode 3) but for the background of this invention the address mode 1 is explained in detail only.

For mode 1 there are two different data formats possible. For the background of this invention an explanation of the program and lead-out area only of the SUBCODE Q channel is given, as it is illustrated in FIG. 5.

TNO, 8 bits, represents the track number running from 0 to 99. A track numbered with AA represents the lead-out track.

X, 8 bits, represents the index number within a track which can range between 0 to 99.

MIN, SEC, FRAME, 8 bits each, is the running time within a track expressed in 6 digits BCD, The minutes of a track are stored in MIN, the seconds are stored in 10 SEC and the frames are stored in FRAME. One second is subdivided into 75 frames (from 0 to 74).

ZERO, all 8 bits are set to zero (0x00).

AMIN, ASEC, AFRAME, 8 bits each, is the running time on the disc expressed in 6 digits BCD. The minutes of a track are stored in AMIN, the seconds are stored in ASEC and the frames are stored in AFRAME. One second is subdivided into 75 frames (from 0 to 74).

CRC is a 16 bit cyclic redundancy check on CONTROL, ADDRESS, TNO, X, MIN, SEC, FRAME, ZERO, AMIN, ASEC, and AFRAME. On the disc the parity bits are inverted. The remainder has to be checked at zero. The CRC is calculated according to following polynomial:

$$P(x) = x^{16} + x^{12} + x^5 + 1$$

The 16 bit CRC field is a parity information that checks the correctness of the CONTROL, ADDRESS, TNO, X, MIN, SEC, FRAME, ZERO, AMIN, ASEC, and AFRAME fields.

Despite apparent advantages of CD-ROM there remain some drawbacks to use a compact disc for marketing and selling large and expensive software packages. A serious drawback is that there is currently no reliable method of protecting a CD-ROM from being copied. The content of a CD-ROM nowadays can be copied onto a hard disc drive or directly onto a CD-Recordable, i.e. CD-R. The software packages illegally copied on a CD-R or on a hard disc drive of a computer will again work without any technical problems.

Therefore, it is an object of the present invention to provide a method of preventing copies of original optical record carriers to be made, in particular a method of creating a key on an original optical record carrier which cannot be copied onto another data carrier and a method of extracting that key off the original optical record carrier in order to be able to distinguish between an original optical record carrier and a copied optical record carrier. Further, it is an object of the present invention to provide an optical record carrier that has a secure copy protection.

The method of obtaining a copy protected optical record carrier carrying information in different blocks according to the invention comprises the following steps:

(a) define number and addresses of blocks used for copy protection;

(b) convert number and addresses selected in step (a) into a copy protection key:

(c) secure information data to be recorded onto the record carrier with copy protection key obtained in step (b);

(d) create a master having modified subcode fields for blocks selected in step (a) and secured information data in other blocks; and (e) replicate record carrier with master created in step (d).

The method of accessing a copy protected optical record carrier carrying information in different blocks according to the invention comprises the following steps:

(a) find blocks having a modified corresponding subcode field;

(b) extract a copy protection key from a pattern of said blocks having a modified corresponding subcode field found in step (a); and (c) retrieve data from the record carrier according to the copy protection key extracted in step (b).

The optical record carrier carrying information in different blocks according to the invention is characterized in that individual accessible blocks in a predetermined pattern carry modified subcode information.

Preferred embodiments of the invention are defined in the respective subclaims dependent on the independent claims 1 and 9.

An embodiment of the present invention concerns a method of creating compact discs that carry a unique identifier, which can also be named as key or fingerprint, since this unique identifier is realized by generating blocks that have modified subcode fields in a predetermined pattern. This method is applicable to mass production. In a further embodiment, a method is described of how to retrieve this identifier and a computer equipped with a CD-ROM drive.

Any data can be stored on the optical storage media, the present invention does not require special data to be recorded nor is there any limitation in the amount of the data in regard to this invention.

In a preferred embodiment, the fingerprint or key of the compact disc is incorporated by implementing a certain amount of SUBCODE Q field modifications throughout the program area of the disc. These SUBCODE 9 field modifications result in invalid SUBCODE g fields. On the other hand, a CD block corresponding to an invalid SUBCODE Q field is still accessible, since its address is also stored in the main code header, as it is shown in FIG. 5.

According to another aspect, the present invention is applicable to a method of encrypting at least one part of a main application or data files stored on a compact disc and the decryption of this at least one encrypted part after retrieving the correct fingerprint of the compact disc by using the copy protection key as the decryption tool.

According to a further aspect, the present invention can be used to implement one or more keys on a compact disc in form of various SUBCODE Q field modification patterns.

The main advantage for a user is that no keys have to be entered during the authentication process of the copy protected record carrier, as the predetermined pattern of blocks with modified subcode information is known before the manufacturing and can be implemented in the data included on the respective record carrier. In combination with external keys, that have to be entered during the access procedure, e.g. by the user, for example also only parts of the content of a compact disc can be unlocked from an original disc. This feature allows the possibility of creating multiple language versions or more or less enhanced versions of a software package which can be restored off an original disc only by "pay for unlock".

This invention is not restricted to any specific format of the wide variety of optical storage media, i.e. audio data, computer data, video data or combinations therefrom, it is rather applicable to all existing optical storage media formats.

As will be shown in the following detailed description of the present invention, CD readers return different results when retrieving sectors, i.e. blocks, which correspond to valid or invalid SUBCODE Q fields. Based on those differences the extracted key will be utilized to descramble or decrypt those parts of the main application that have been encrypted before. If the decryption was done with the correct key upon retrieving it from an original disc, or in other words, it the decryption was done with the same key that has been used for encrypting the application beforehand, the main application can be fully restored to its generic layout and will properly work on the computer platform that it was designed for. Since the SUBCODE Q fields are normally not directly copied from one disc to another, as the main code data, but are newly generated during the copy process, retrieving a key from a copied or non original disc will result in a different key than the one that has been used for encrypting, and will furthermore result in a different decryption process and decryption result. Therefore it is not possible to execute such a decrypted application on the computer platform that it was designed for.

The accompanying drawings, which are incorporated in and constitute a part of this specification, illustrate embodiments of the invention and, together with a general description of the invention given above, and the detailed description of the embodiment given below, serve to explain the principles of the invention, wherein:

FIGS. 1a and 1b illustrates the pattern of the nickel master referred to as pits and land which is then embossed on the surface of a polycarbonate or PMMA substrate.

FIGS. 2a and 2b illustrates the readout of a Compact Disc;

FIG. 3 illustrates a standard CD-ROM mode 1 data sector:

Figure 8:
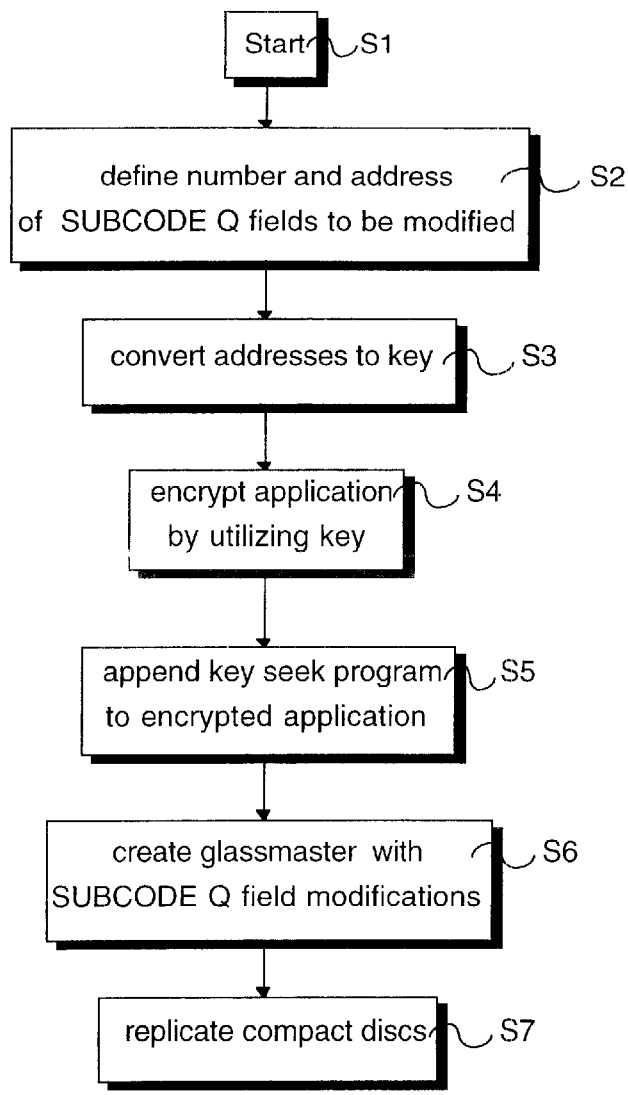
Figure 9:
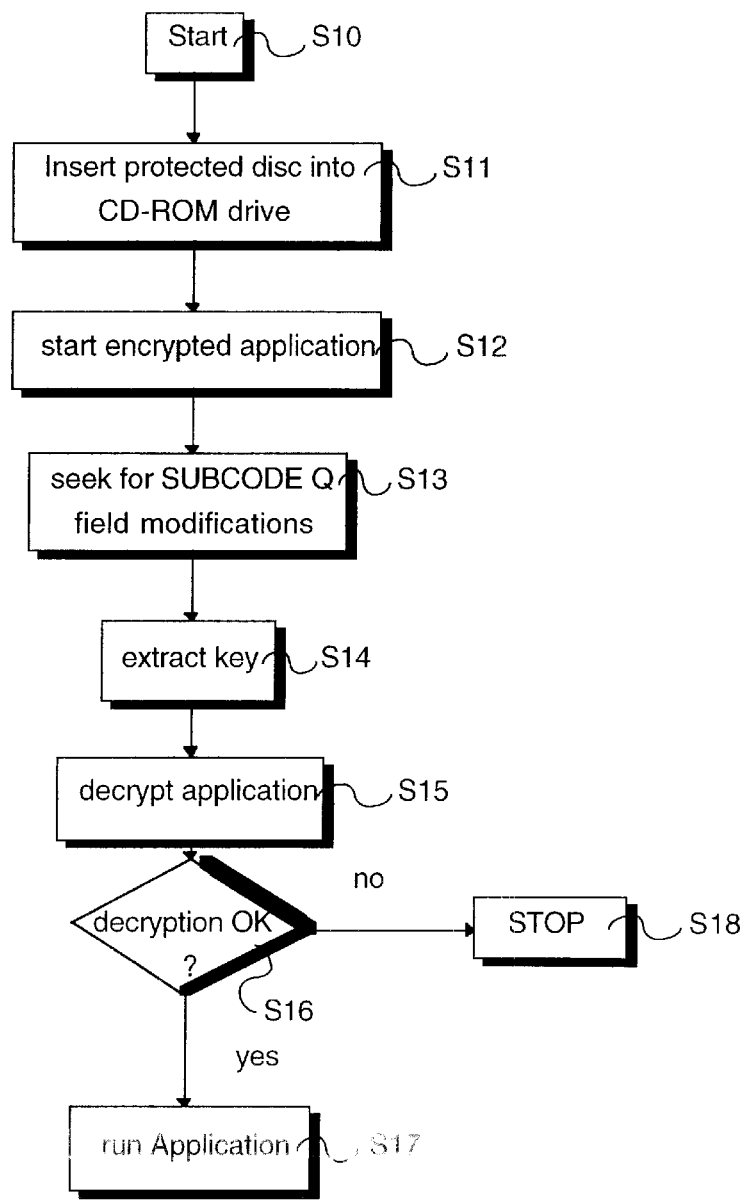

FIG. 4 illustrates the structure of CD-ROM data encoded on a Compact Disc, which consists of data, C1, C2 error correction and 8 SUBCODE channels called SUBCODE P, Q, R. S. T, U. V, W;

FIG. 5 illustrates the detailed layout of 98 bits of the SUBCODE Q channel;

FIG. 6 is a chart of the distribution of resumed SUBCODE Q fields by CD-ROM drives when seeking for an invalid SUBCODE 9 field;

FIG. 7 is a chart of the distribution of returned SUBCODE Q fields by CD-ROM drives when seeking for a valid SUBCODE 9 field;

FIG. 8 is a flow chart of the encoding and manufacturing process of copy protected compact disc by subcode Q field modifications; and FIG. 9 is a flow chart of the operations performed by a protected application and protected disc when used in a computer system.

In the following, a method of creating a unique key on optical storage media, e.g. compact discs, and the method of extracting or reading this fingerprint off the disc is described.

As stated above, the main data of each CD-ROM sector is associated to a SUBCODE Q channel or SUBCODE Q field which contains the unique address (in minutes, seconds, frames) of this sector. A 60 minute CD-ROM e.g. contains 270 000 sectors and 270 000 SUBCODE Q fields.

Since the SUBCODE Q fields normally will be regenerated during the copy process, a predetermined pattern of invalid SUBCODE Q fields, e.g. SUBCODE Q fields carrying invalid addresses, can serve as unique identifier of the disc itself. As stated above, a disc accessing device, e.g. a CD-ROM reader, can distinguish between a block with invalid SUBCODE Q field and a block having a valid SUBCODE Q field, e.g. a SUBCODE Q field carrying a valid address, therefore, when accessing such a block having an invalid SUBCODE Q field, the accessing device first resumes a wrong block. On the other hand, there is no possibility to produce a defect SUBCODE Q field for a device that facilitates the production of an optical disc, since the SUBCODE Q field is not directly copied onto the disc from the original, but newly generated during the copy process. Therefore, an illegal copy contains only valid SUBCODE Q fields, which makes it possible to distinguish between an original and a copied product.

Since the address of a block is not only stored in the corresponding SUBCODE Q field, but also in the main code header, as shown in FIG. 5, an optical disc comprising invalid SUBCODE 9 fields is still within the standard, e.g. the Yellow Book for CD-ROM, since all blocks can be accessed at least with the help of their address stored in the main code header.

When a CD-ROM drive is reading any sector on a compact disc, typically the drive scans along the track and decodes the SUBCODE Q addresses. Once getting close to the address that has been sought for, the firmware of the drive decodes the address in the main code header and returns this sector to the calling application.

There is also the possibility of getting the position of the optical pickup of a CD-ROM reader by seeking for a certain address and asking the drive for the position of the pick up. Before returning the SUBCODE Q field to the calling application the firmware of the drive recalculates the SUBCODE Q CRC field and validates the content of the remaining bytes in the SUBCODE Q field. If the checked SUBCODE Q field was free of error it will return the SUBCODE Q field that it has been asked for. If the recalculation of the 16 CRC bits results in a mismatch to the stored 16 bits CRC on the disc, the drive will not return the SUBCODE Q field that it has been asked for. Depending on the strategy of the drive, it will return the content of the SUBCODE Q fields of one or more blocks before or after the block which contained an error in the SUBCODE Q field, i.e. an invalid SUBCODE Q field.

The search for the SUBCODE Q field modifications on the compact disc can be conducted by a special device or by a software tool. In an embodiment of this invention a program seeks for certain addresses including at least all those that have been set invalid by implementing a modification on the SUBCODE Q field during the mastering process. Depending on the strategy of the CD-ROM reader it will return a SUBCODE Q field that is either one or more blocks before or after the block that contains the error when trying to access a block having an invalid address in the corresponding SUBCODE Q field.

FIG. 6 illustrates the: distribution of resumed blocks of a variety of CD-ROM drives when accessing a SUBCODE Q field that contains an error. Here, a Gaussian distribution around the invalid SUBCODE Q field is shown that has a gap at the position of the invalid SUBCODE Q field.

FIG. 7, on the other hand, demonstrates the distribution of resumed blocks of a variety of CD-ROM drives when accessing a SUBCODE Q field when there is no error in this field. Here, a Gaussian distribution around the invalid SUBCODE Q field is shown that has no gap at the position of the invalid SUBCODE Q field.

As can be seen in FIG. 6 and FIG. 7 there is a difference in the return values of CD-ROM drives when seeking for an invalid SUBCODE Q field or when seeking for a valid SUBCODE Q field. This difference in the return values and furthermore the location of the difference results in the key that is then extracted of the optical disc.

FIG. 8 shows a flowchart of an encoding and manufacturing process of copy protected compact discs according to the invention.

After starting the process in step S1, a certain number of SUBCODE Q fields and corresponding addresses are freely defined in step S2. These SUBCODE Q fields form the unique identifier of all valid record carriers of this type. These defined SUBCODE Q fields later on undergo a SUBCODE Q field modification, which furthermore respectively results in an invalid SUBCODE Q field. A typical range of modified SUBCODE Q fields in an embodiment of this invention runs between a number of 6 and 60. The creation of these modifications is realized in the mastering stage. As alternative, a software programme that generates the SUBCODE frames also creates those SUBCODE Q field modifications as predefined.

In a following step S3 the addresses of the SUBCODE Q fields selected in step S2 are converted into a copy protection key. Using this key, the data to be stored on the disc, e.g. an application programme or user data, is encrypted in step S4. Thereafter, in step S5, an extraction and decryption programme will be appended to the encrypted data, to allow the user to access the data without any special requirements. The extraction programme scans the disc at least for invalid SUBCODE Q fields and extracts the copy protection key therefrom. Of course, it is also possible that the copy protection key is based on a combination of valid and invalid SUBCODE Q fields. The decryption programme decrypts the accessed data using the extracted copy protection key.

During the mastering process in step S6, when exposing the photoresist by the laser that is modulated by the data, all SUBCODE Q field modifications will be placed on the glass master.

Therefore, in step S7, each CD that is embossed in the replication process by such a created stamper carries exactly the same SUBCODE Q field modifications. Since the number and also the addresses of the invalid SUBCODE Q fields are known before manufacturing of the disc, i.e. of the glass master, and can be incorporated into the data stored on the disc, the SUBCODE 9 filed modifications, i.e. the invalid SUBCODE Q fields, can be taken as the key or the fingerprint that the CDs have been provided with. The data stored on the disc can then only be accessed if the key stored on the disc as data matches to the key included on the disc on the basis of invalid SUBCODE Q fields or if the data stored on the disc is decrypted using the copy protection key extracted from the disc.

The encryption of an application that this copy protection system is used for can be any standard method. A variety of encrypting schemes and methods exists, such as byte substitution, word substitution or polynomial functions by two byte-arrays, whereas the first byte-array represents the user application and the second byte-array represents the key. The application can be encrypted completely or just partially. If partial encryption has been chosen typically 4 to 2048 bytes are encrypted. Also several different encryption schemes or keys can be used for different parts of the application stored on the optical storage medium.

FIG. 9 shows a flow chart of the operations performed by a protected application and a protected disc when used in a computer system.

After the start of the process in step S10, the insertion of a copy protected disc into the CD-ROM drive in step S11 and the starting of the encrypted application in step S12, the process is set forth with the extracting procedure.

First, in step S13 a search for at least predetermined invalid SUBCODE Q fields is conducted. According to an embodiment of this invention, a predetermined number of blocks having predetermined addresses will be checked for valid or invalid SUBCODE Q fields. Depending on the returned results from the CD-ROM drive it is validated if a predetermined block is directly accessible or not. A list of these results will be stored. This list comprises all of these predetermined blocks and the respective corresponding result.

Once the scanning for predetermined SUBCODE Q fields has been completed the copy protection key will be extracted in step S14 according to the list stored in step S13. Upon extracting at least predetermined invalid SUBCODE Q fields the fingerprint or the unique key of the optical disc can be regenerated. This key was originally taken to partially or completely encrypt the application.

Now this key is taken to decrypt the encrypted application in step S15. If it is determined in step 16 that the original key and the extracted key match, the decryption will work properly and the application can be loaded and run in step S17. On the other hand, if the extraction of the key was done off a non original disc, the extraction will result in a different key than the original key. Therefore, a decryption of an application by utilising a non original key will result in a non workable application and the process will stop in step S18.

What is claimed is:

1. Method of obtaining a copy protected optical record carrier carrying information in different blocks, comprising the following steps:
   (a) define number of subcode fields and corresponding addresses of blocks used for copy protection;
   (b) convert number of subcode fields and corresponding addresses selected in step (a) into a copy protection key;
   (c) secure information data to be recorded onto the record carrier with copy protection key obtained in step (b);
   (d) create a master having modified and therefore invalid subcode fields for blocks selected in step (a) and secured information data in other blocks; and
   (e) replicate record carrier with master created in step (d).

2. Method according to claim 1, characterized in that said step (c) of securing the record carrier comprises the following steps:
   (c1) encrypt data to be recorded with said copy protection key derived in step (b) at least partially; and
   (c2) append extraction and decryption programme to said encrypted data derived in step (c1), wherein said extraction programme finds said blocks carrying modified subcode information and extracts said copy protection key therefrom, and said decryption programme decrypts said information data encrypted in step (c1) according to said copy protection key extracted by said extraction programme when they are executed.

3. Method according to claim 1, characterized in that said step (c) of securing the record carrier comprises the following steps:
   (c1) append extraction and comparing programme to said information data, and
   (c2) append copy protection key to said information data, wherein said extraction programme finds said blocks carrying modified subcode information and extracts said copy protection key therefrom, and said comparing programme compares said extracted copy protection key and said appended copy protection key to be able to at least partially deny access to said information data in dependency on the correlation of said both copy protection keys when they are executed.

4. Method according to claim 1, characterized in that said modified subcode fields are modified as to be recognized invalid by a reading device.

5. Method according to claim 1, characterized in that said modified subcode fields are created so that they include no or invalid address information.

6. Method according to claim 1, characterized in that said modified subcode fields are SUBCODE Q fields.

7. Method according to claim 1, characterized in that said record carrier is a compact disc and said information is audio data together with control data and information data.

8. Method according to claim 1, characterized in that said record carrier is a compact disc read only memory and said information is any form of digital data.

9. Method of accessing a copy protected optical record carrier carrying information in different blocks, comprising the following steps:
   (a) find blocks having a modified and therefore invalid corresponding subcode field;
   (b) extract a copy protection key from a pattern of said blocks having a modified and therefore invalid corresponding subcode field found in step (a); and
   (c) retrieve data from the record carrier according to the copy protection key extracted in step (b).

10. Method according to claim 9, characterized in that said step (a) includes the finding of blocks having a modified corresponding SUBCODE Q field.

11. Method according to claim 9, characterized in that said step (a) includes the following steps:
   (a1) trying to access a predetermined block based on the address defined in the SUBCODE Q field of said block by sending a respective command to an optical pickup of a disc drive to access said predetermined block;
   (a2) determining if said optical pickup has accessed said predetermined block by checking of the block address defined in the SUBCODE Q field or the main code data directly after the access procedure of the optical pickup; and
   (a3) storing all block addresses of blocks the optical pickup could not access directly.

12. Method according to claim 11, characterized in that said step (a3) additionally comprises the step of storing all block addresses of blocks the optical pickup could access directly, and in said step (b) of extracting a copy protection key said key is extracted from a pattern of said blocks having a modified corresponding subcode field and of said blocks having no modified corresponding subcode field.

13. Method according to claim 9, characterized in that said step (c) of retrieving data from the record carrier comprises the decryption of the retrieved data with copy protection key extracted in step (b).

14. Method according to claim 9, characterized in that said step (c) of retrieving data from the record carrier comprises the following steps:
   comparison of the copy protection key extracted in step (b) and a copy protection key appended to the information carried by the record carrier;
   allowing at least partial or no access to said information data in dependency on the correlation of said both copy protection keys.

15. Method according to claim 9, characterized in that said step (c) of retrieving data from the record carrier comprises the following steps:
   comparison of a copy protection key entered during the data retrieval with the copy protection key extracted in step (b), and
   allowing at least partial or no access to said information data in dependency on the correlation of said both copy protection keys.

16. Method according to claim 9, characterized in that said steps of data retrieval are conducted with the help of software included on the record carrier.

* * * * *